United States Patent [19]
Holt

[11] Patent Number: 5,839,742
[45] Date of Patent: Nov. 24, 1998

[54] CAM OPERATED VEHICLE SUSPENSION SYSTEM

[76] Inventor: Laurence J. Holt, 8859 Concession 4, Uxbridge, Ontario, Canada, L0C 1E0

[21] Appl. No.: 656,357
[22] PCT Filed: Oct. 6, 1995
[86] PCT No.: PCT/CA95/00570
§ 371 Date: Jun. 7, 1996
§ 102(e) Date: Jun. 7, 1996
[87] PCT Pub. No.: WO96/11815
PCT Pub. Date: Apr. 25, 1996

[30] Foreign Application Priority Data

Oct. 12, 1994 [CA] Canada ................................. 2117945

[51] Int. Cl.⁶ .............................. B60G 3/20; B60G 11/14
[52] U.S. Cl. .............................. 280/124.134; 280/124.135; 280/124.179; 280/5.515; 267/248; 267/255
[58] Field of Search ....................... 280/690, 691, 280/696, 701, 692, 693, 695, 697, 698, 700, 726, 725, 724, 716, 713, 721, 722, 666, 670, 671, 672, 663, 689, 5.508, 5.512, 5.515, 124.134, 124.135, 134.136, 124.141, 124.179, 124.177, 124.165, 124.157; 267/248, 255, 256, 257

[56] References Cited

U.S. PATENT DOCUMENTS

| | | |
|---|---|---|
| 1,875,314 | 8/1932 | Armstrong . |
| 1,991,911 | 2/1935 | Riley ........................................ 280/696 |
| 2,198,544 | 4/1940 | Leighton ................................. 280/696 |
| 3,157,394 | 11/1964 | Kelley ..................................... 280/690 |
| 3,161,420 | 12/1964 | Rix .......................................... 280/716 |
| 3,460,852 | 8/1969 | Benson .................................... 280/724 |

FOREIGN PATENT DOCUMENTS

| | | |
|---|---|---|
| 0 371 709 | 6/1990 | European Pat. Off. . |
| 459067 | 10/1913 | France . |
| 5-254327 | 10/1993 | Japan ..................................... 280/698 |
| 634115 | 3/1950 | United Kingdom . |
| WO 88/07454 | 10/1988 | WIPO . |
| WO 91/07290 | 5/1991 | WIPO . |

*Primary Examiner*—Peter C. English
*Attorney, Agent, or Firm*—Pennie & Edmonds LLP

[57] ABSTRACT

A suspension system with a contained force system which concentrates loads in the suspension geometry control elements. The suspension system permits elimination of large, heavy load bearing structures in remote areas of the vehicle, use of a compact, modular structure, and combination of suspension geometry control and spring/damping in one unit. The modular suspension system for a wheeled vehicle includes a wheel and hub assembly, a relatively heavier vehicle body, an interposed energy storage medium, and a mechanism to releasably store energy in the medium upon relative movement between the wheel and hub assembly and the vehicle body.

10 Claims, 13 Drawing Sheets

CAM OPERATED VEHICLE SUSPENSION SYSTEM

BACKGROUND OF THE INVENTION

1. Field of the Invention

This invention relates to a suspension system for wheeled vehicles, and in particular to a modular suspension system in which the energy storage medium may releasably store energy to any predetermined degree at any relative position between the wheel and hub assembly and the vehicle body.

2. Discussion of the Prior Art

Although not as old as the wheel itself, suspension can be traced back to well before the internal combustion engine and what we refer to as the car. The wheel has always been considered the key invention as it provided a means to transport objects that had previously been immovable. Once its usage became widespread, however, inherent problems became obvious. A vehicle (whether a farm cart or modern Formula 1 car) consists of a relatively large mass rolling on a surface by means of wheels. Most vehicles will operate acceptably, without suspension, if the surface in question is as smooth as a billiard table. If a bump is introduced which one or all of the wheels have to negotiate, however, three significant drawbacks become immediately evident. The entire vehicle is forced to travel up and over the bump resulting in:

(a) the passenger being directly subjected to the effect of the entire bump, so that what the industry refers to as "ride" suffers greatly;

(b) significant energy being expended as the mass of the entire vehicle is forced to rise up over the bump, which can significantly reduce the forward speed of the vehicle; and (c) the vehicle becoming increasingly difficult to steer as forward speeds increase (to anything above that of a brisk walk) as it is pitched around by the bump, or by multiple bumps.

All of these drawbacks are significant and it should be understood that suspension is not installed just to improve "ride" quality. Modern racing cars do not use suspension for "ride" at all; it is included to deal with items (b) and (c) above almost exclusively, namely speed reduction and "pitch".

Suspension has evolved from leather straps on vehicles such as the Hansom cab to the almost universally accepted spring and damper arrangement. Some energy storage medium such as a spring is always included.

Figure 1:
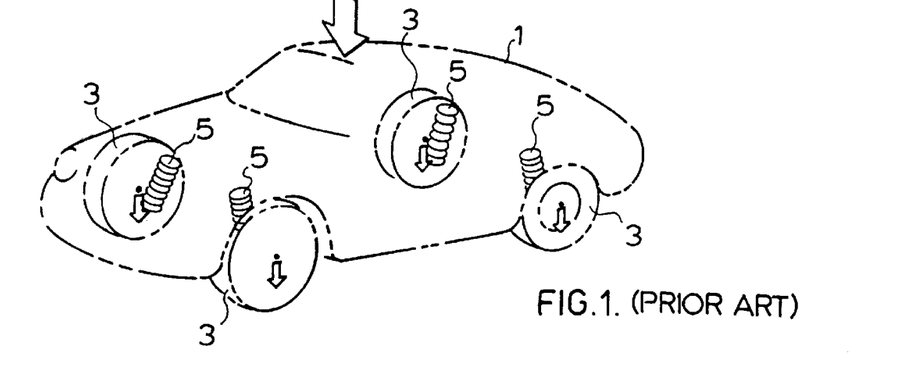
FIG. 1 is a schematic, perspective view of a typical wheeled vehicle suspension system.

To understand how a modern suspension functions, one has to consider the vehicle as being comprised of five distinct mass systems (the main body and four wheel systems) as shown in FIG. 1 (assuming four wheel independent suspension). Obviously the primary system is the main vehicle weight which is referred to as the "sprung mass". Each wheel, tire and hub (usually with braking hardware attached) obviously has a significant weight and, being 'upstream' of the suspension, is referred to as "unsprung mass". The root concept of modern suspension is to isolate the "unsprung mass" from the "sprung mass" by means of an energy storage medium, which is typically a spring. This allows the "unsprung mass" (wheel and hub assembly) to travel up and over bumps independently of the main vehicle mass. The lighter "unsprung mass" can move against the heavier "sprung mass" without upsetting the latter because of the large differential in inertias between them. The relatively lighter the "unsprung mass" (or conversely, the relatively heavier the "sprung mass") is, the better is the system performance. A spring (whether coil, leaf, torsion bar, air/nitrogen, rubber etc.) is used to allow the wheel and hub assembly to move independently of the main vehicle mass.

This standard suspension configuration works well and such a suspension system can be tuned to a particular vehicle by changing the spring rate. However, a spring in isolation possesses an inherent deficiency in that once upset, it will continue to oscillate for a lengthy period unless external forces are brought to bear on it. A damper is thus included to offset the oscillatory nature of the spring and bring it to rest expeditiously.

The root of suspension theory is Newton's second law of motion (F=Ma). Force is equal to the mass times its acceleration. A spring generates force in reaction to a given displacement input. The force it returns is directly proportional to the imparted displacement (i.e. the distance it is compressed). The equation which describes this relationship is written as follows:

$$F = Kx, \text{ where } F = \text{generated force}$$
$$K = \text{spring rate}$$
$$x = \text{imparted displacement}$$

A damper generates force in reaction to a given velocity input. The force it returns is directly proportional to the imparted velocity (speed of movement of the damper). The equation which describes this relationship is written as follows:

$$F = Cv, \text{ where } F = \text{generated force}$$
$$C = \text{damping coefficient}$$
$$v = \text{imparted velocity}$$

Since a bump input is an imparted displacement, rather than an imparted velocity, it becomes obvious that the spring is the primary suspension component and the damper (shock absorber) performs a somewhat secondary function. This is illustrated by the fact that if an automobile's shock absorbers fail, the driver can continue to drive the automobile despite the resulting oscillations. A broken spring, however, will render a car inoperable.

Thus, with the proper combination of springs and shock absorbers, an acceptable suspension system can be created. Unfortunately, the analysis leading to such a system only considers the "ride" of the vehicle which is not the sole criteria by which automobile performance is judged. The industry also has a secondary requirement known as "handling". Unfortunately, given the existing methods of controlling "ride" and "handling", improving one can be detrimental to the other.

Figure 2:
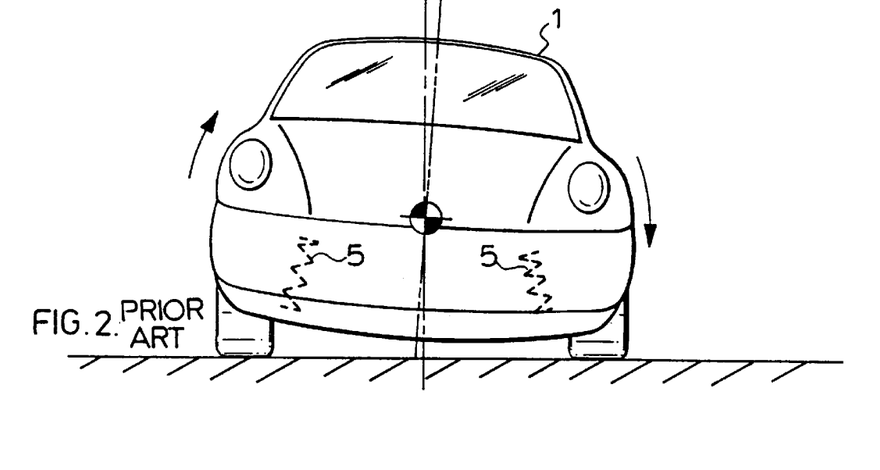
FIG. 2 is a schematic, front view of a typical wheeled vehicle negotiating a curve to driver's right.
Figure 3:
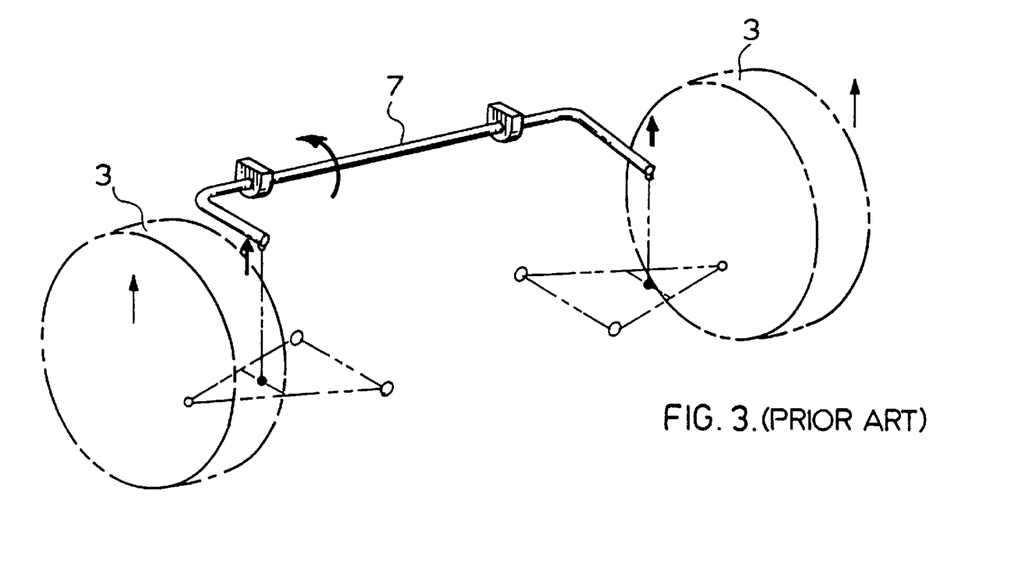
FIG. 3 is a schematic, perspective view illustrating a prior art anti-roll bar subjected to a cornering load.

As a car negotiates a corner or curve, it will tend to "roll" outwards on its suspension due to the centrifugal force acting on its centre of gravity (illustrated in FIG. 2). Additionally, under heavy braking the deceleration causes the vehicle to "pitch" forward on its suspension. Both of these phenomena create poor handling. Both roll and pitch can be reduced by stiffening the springs, which unfortunately directly degrades the vehicle's ride quality. The inclusion of a device known as an anti-roll bar can significantly reduce the roll effect without the significant degradation in ride associated with stiff springs. This device ties the two sides of the car together with a designed stiffness. When the car rolls onto the outside suspension, the anti-roll bar pulls the inside suspension up and subsequently maintains a flatter vehicle attitude (FIG. 3). The anti-roll bar does cause some negative ride qualities, however, as it couples the suspension systems together.

There are presently two major suspension configurations utilized on production automobiles. These are the MacPherson strut (FIG. 4) and the double 'A' arm (FIG. 5). The double 'A' arm (double control arm) may be configured in many different and diverse ways including the now fashionable "Short Long Arm" (SLA) arrangement. There are other configurations, but they are not widely utilized. The McPherson strut is popular on front wheel drive vehicles as it provides clearance for half shafts and simply facilitates the steering function. Double control arm arrangements cause problems on front wheel drive vehicles since the spring damper unit needs to occupy the same packaging volume as the half shaft.

Figure 6:
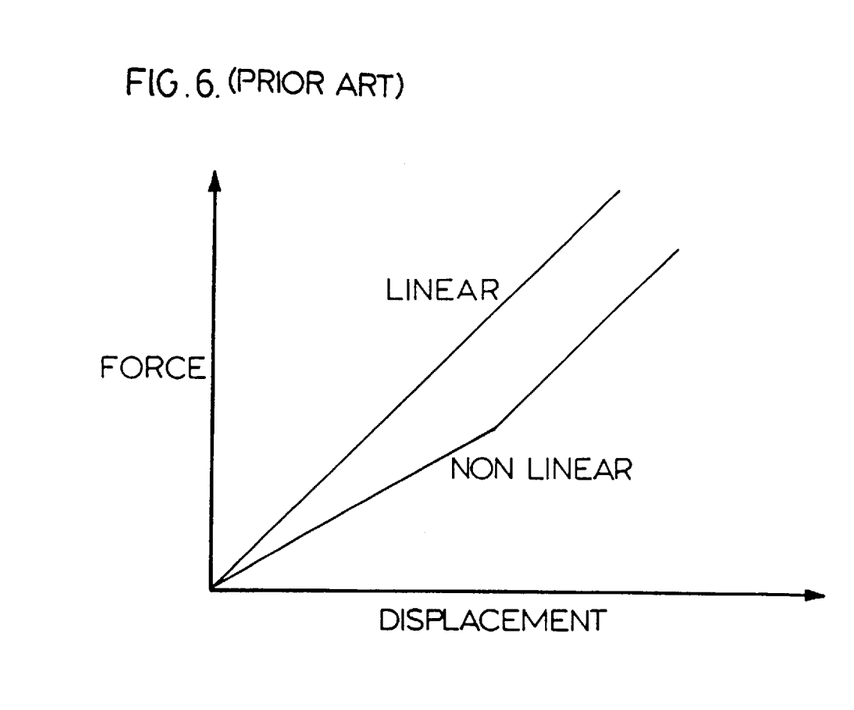
FIG. 6 is a graph illustrating load and displacement for typical linear and non-linear spring rates.

The conventional suspension systems described above possess a number of inherent limitations. All of the above arrangements drive suspension loads through a spring/damper system into remote areas of the vehicle (i.e. away from the suspension geometry control system). This necessitates heavy and expensive structural mounts such as the strut tower arrangement found on many front wheel drive vehicles. These systems also come in many pieces and require assembly during construction of the vehicle. The major drawback, however, is the fixed relationship that exists between the wheel movement and the spring compression. This may not be a directly linear relationship but it is fixed. It may be desirable, and is possible, to increase the wheel rate (the effective spring rate at the contact patch of the tire) during large bump inputs so that suspension bottoming does not occur (FIG. 6). This arrangement provides a soft ride over small bumps but gets stiffer during larger inputs. Once such a suspension system has been designed, however, with an acceptable compromise having been made between ride and handling, nothing more can be done. Many systems now offer a so called "sport/touring" or "hard/soft" ride choice, which is no more than an electronic revalving of the shock absorbers. As previously described, this damping function is a secondary consideration and does not truly offer a choice between soft and hard ride as determined by the spring.

The biggest departure in suspension development in recent history, and by far the greatest innovation, has been the use of active suspension systems. Active suspension refers to the complete removal of the passive spring/damper unit and its replacement by a hydraulic cylinder. A hydraulic cylinder, filled with oil, will provide no suspension function when left to its own devices and the car will be reduced to a bucking, uncontrolled rolling mass when subjected to bumpy conditions. However, if bump inputs can be sensed and a hydraulic pump and valving system made to act in an expeditious manner (using a computer based control system), the cylinder can be raised and lowered to move the wheels over undulations. This is the basic function (and most difficult to achieve) of such an active suspension system but the secondary gains are huge in that pitch and roll can be virtually completely "dialled out" or eliminated with the correct sensing and control algorithms. The major limitation with active suspension has been the ability of the systems to sense and move quickly enough to react properly to bump inputs. This is still an insurmountable problem for road vehicles and the Formula 1 vehicles in which use of such systems is only proving successful due to the extremely costly components employed and the extremely flat road surfaces to which they are subjected.

SUMMARY OF THE INVENTION

The present invention overcomes many of the problems inherent in prior art suspension systems as described above.

Figure 7:
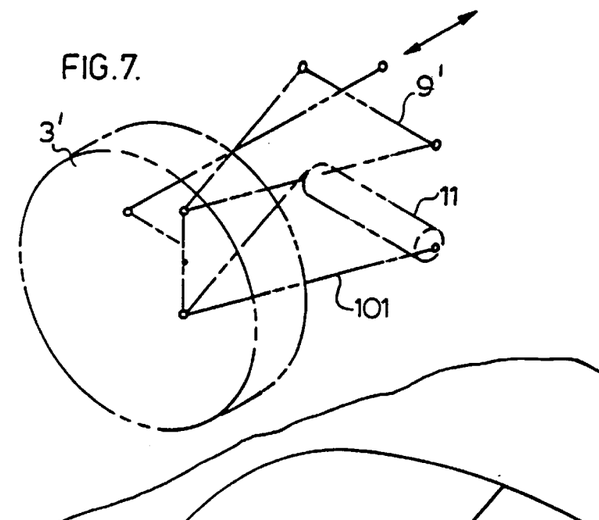
FIG. 7 is a schematic, perspective view of a wheel equipped with the suspension system of the present invention using a double "A" arm configuration.
Figure 8:
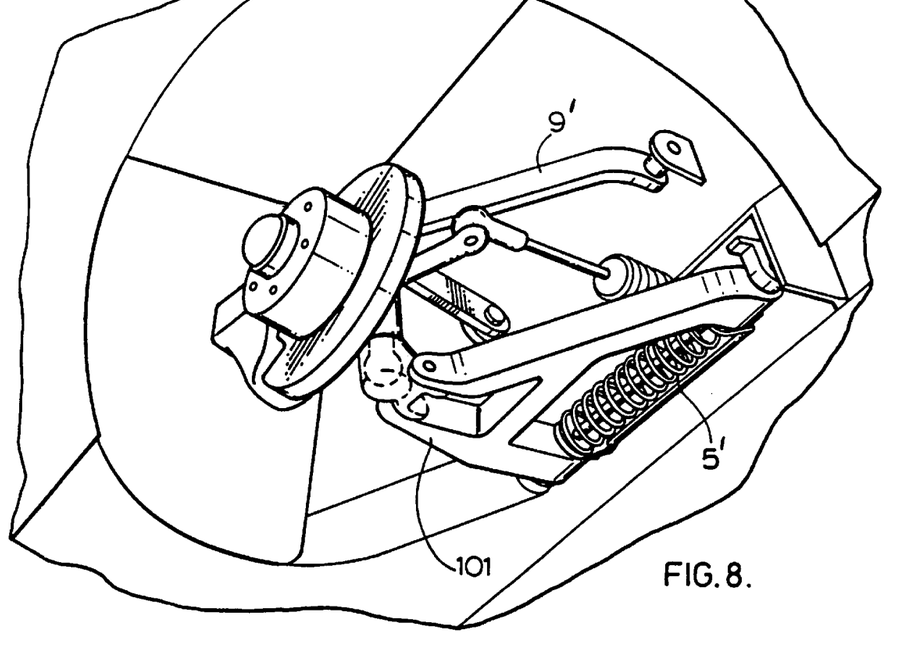
FIG. 8 is a schematic, perspective view of a hub assembly equipped with the suspension system of the invention.
Figure 9:
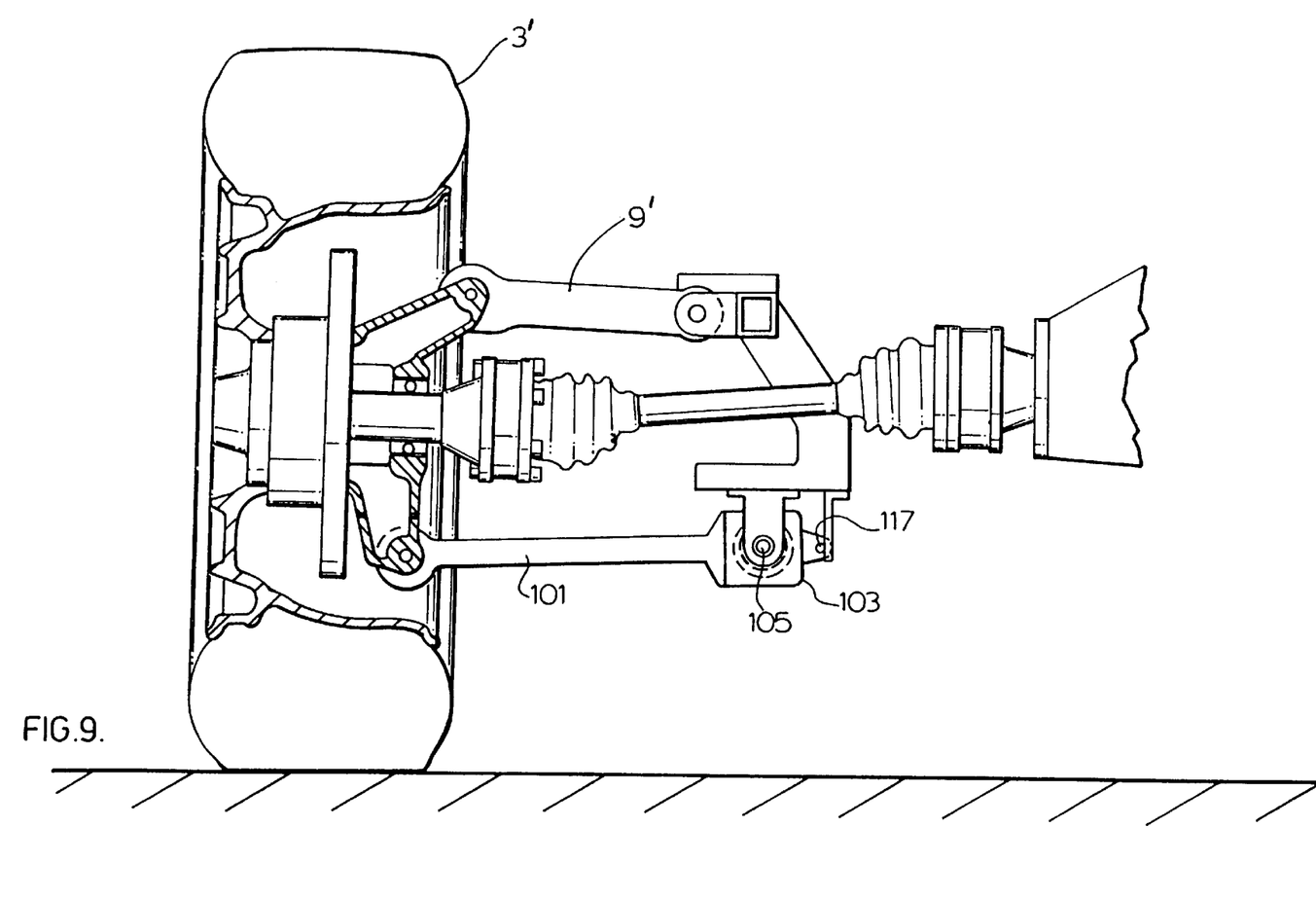
FIG. 9 is a front semi-sectional view of a wheel and hub assembly equipped with the suspension system of the invention.
Figure 10:
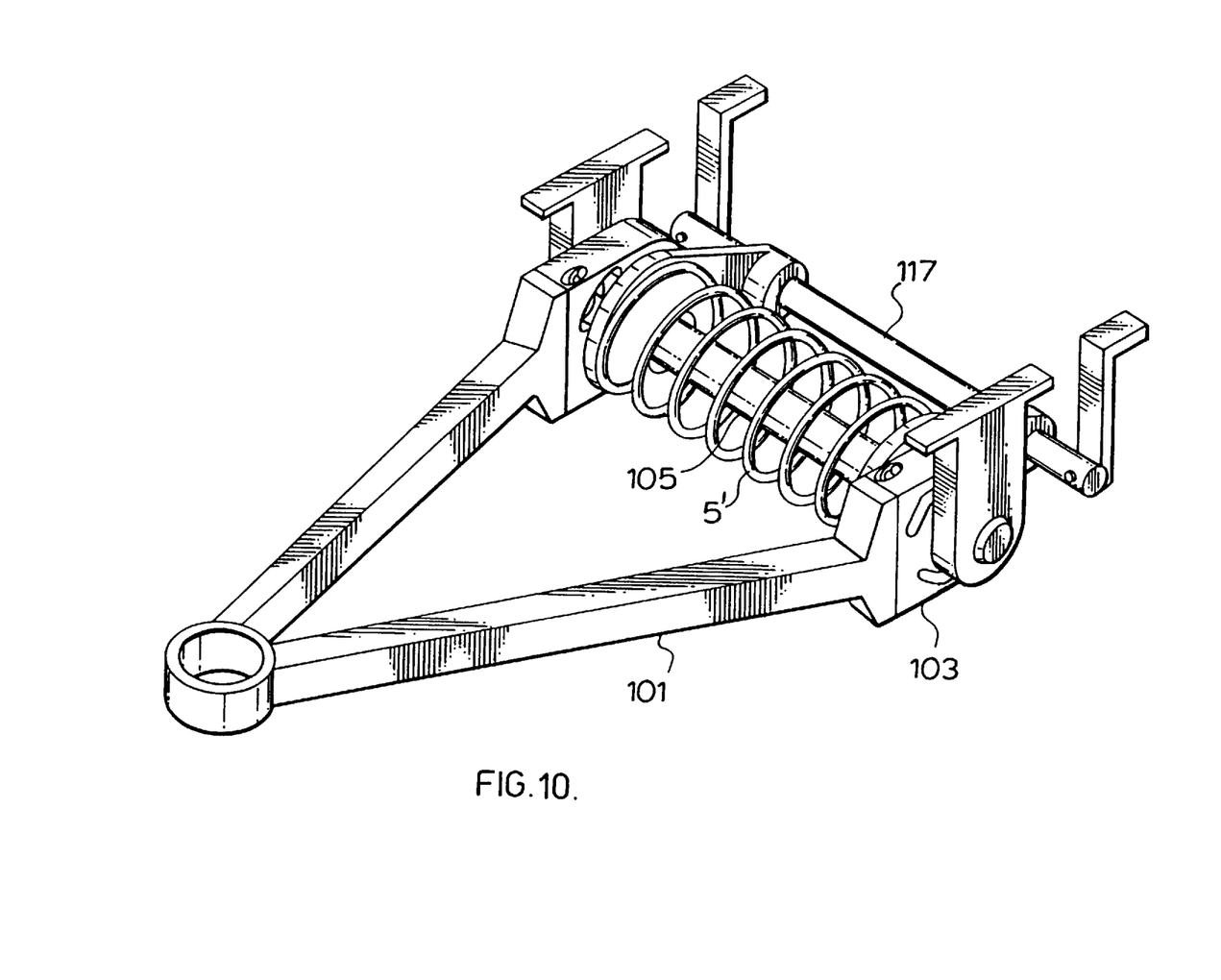
FIG. 10 is a schematic, perspective view of a portion of the suspension system of the invention.
Figure 11:
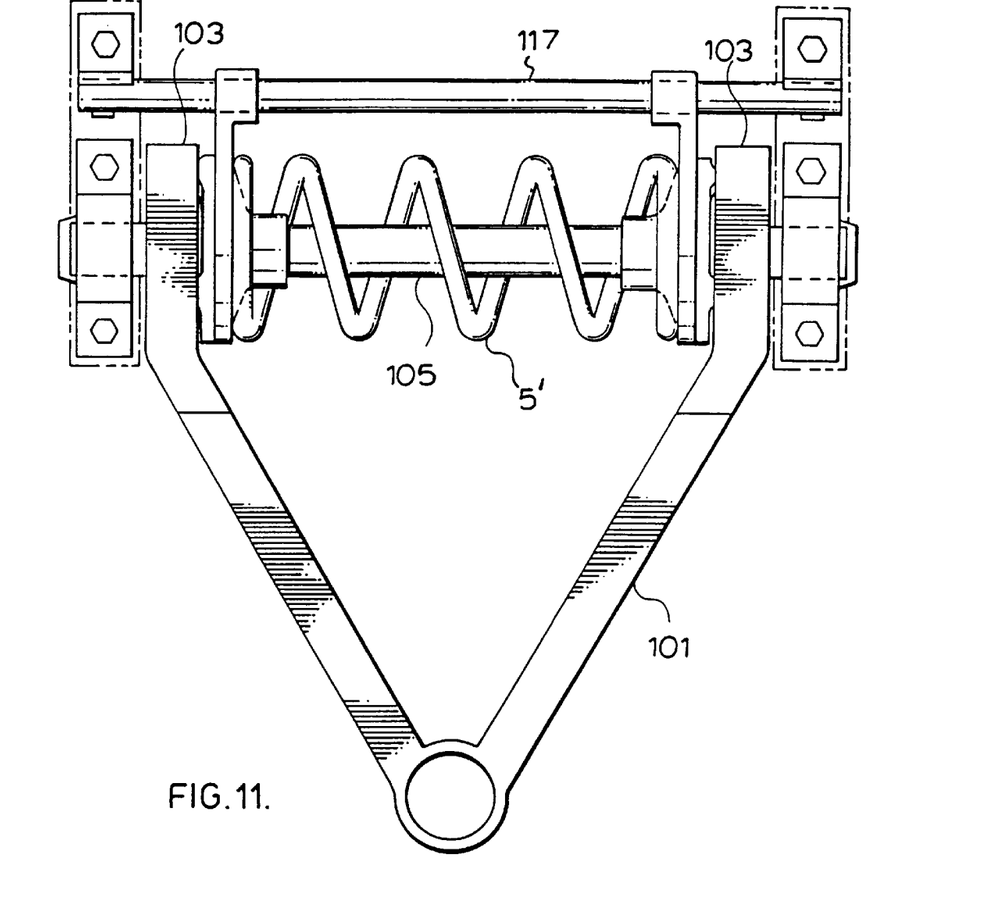
FIG. 11 is a schematic, plan view of a portion of the suspension system of the invention.
Figure 12:
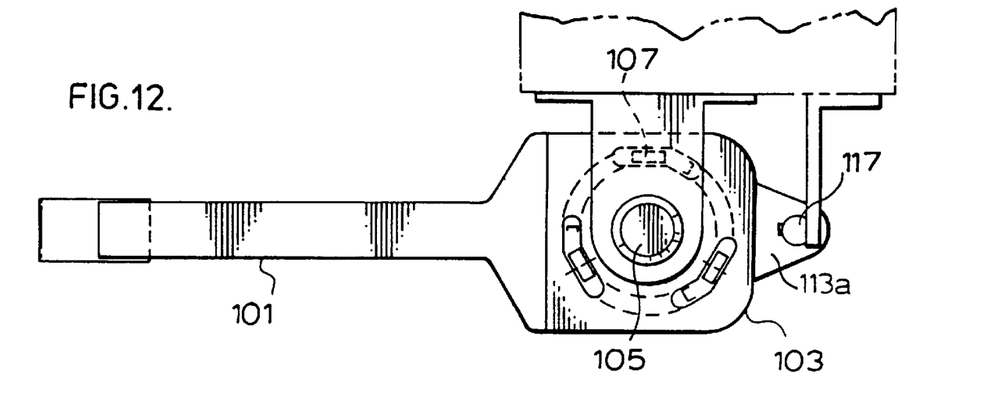
FIG. 12 is a schematic, front view of a portion of the suspension system of the invention.
Figure 13:
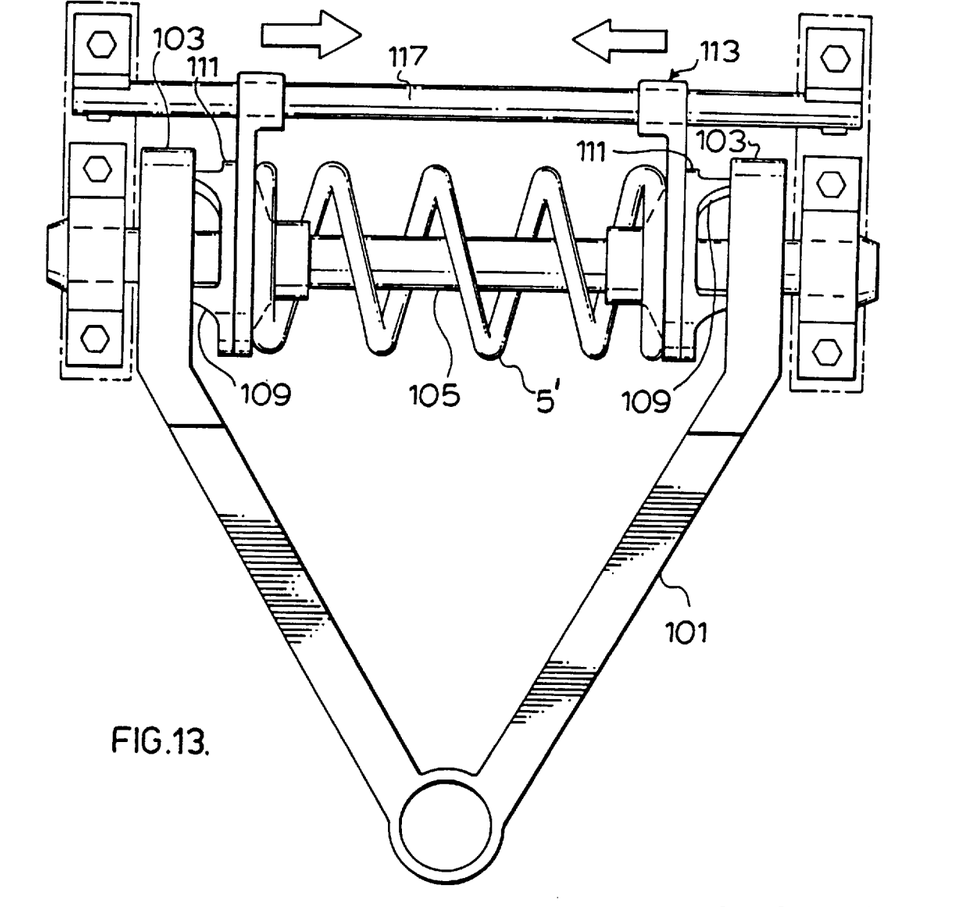
FIG. 13 is the view of FIG. 11 showing motion of components of the suspension system of the invention.
Figure 14:
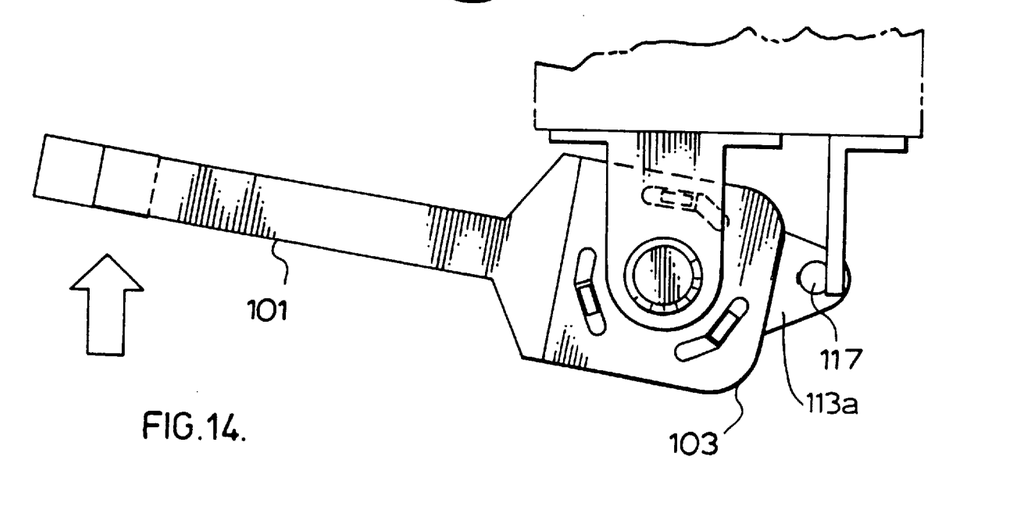
FIG. 14 is the view of FIG. 12 showing motion of components of the suspension system of the invention.
Figure 15:
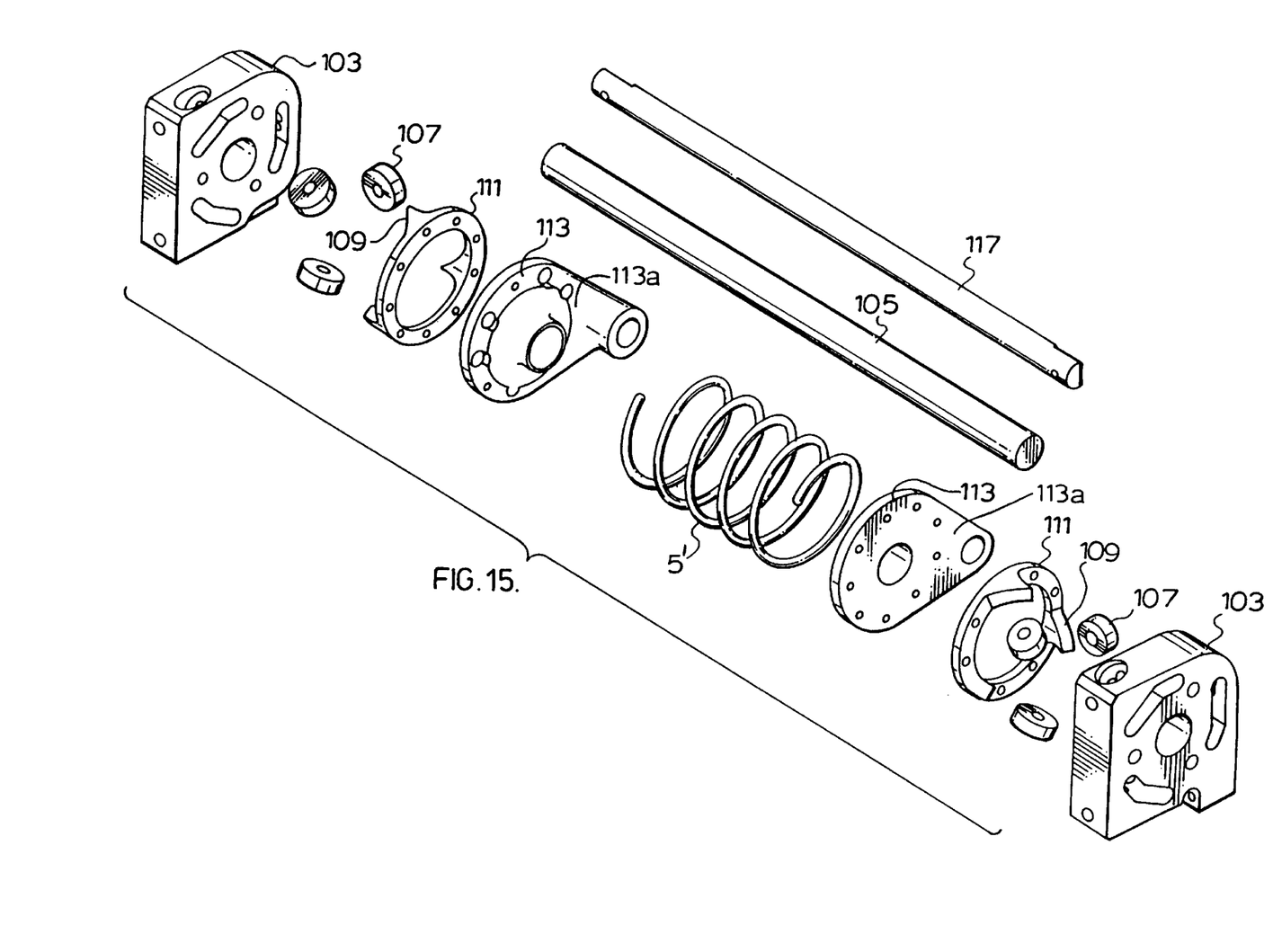
FIG. 15 is an exploded, perspective view of selected components of the suspension module of the invention.
Figure 16A:
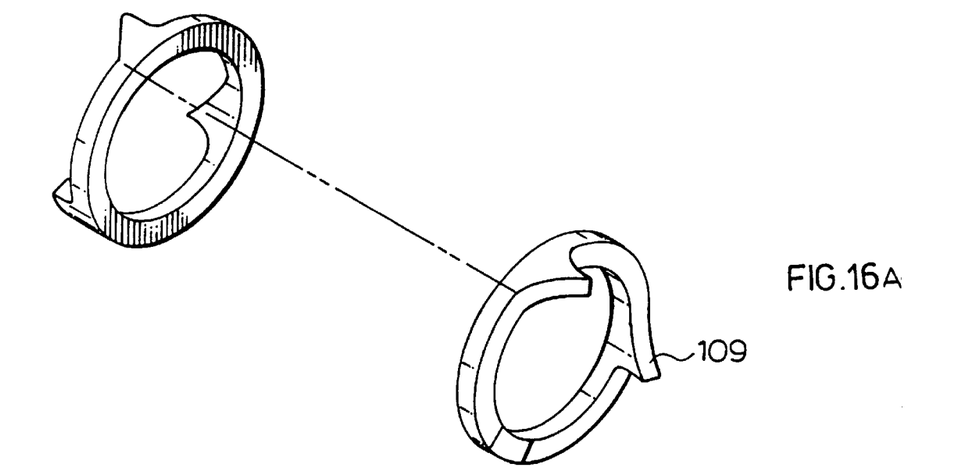
FIGS. 16A, 16B, and 16C illustrate the relationship between load and displacement resulting from motion of selected components of the suspension system of the invention, with simultaneous engagement of cam surfaces.
Figure 16B:
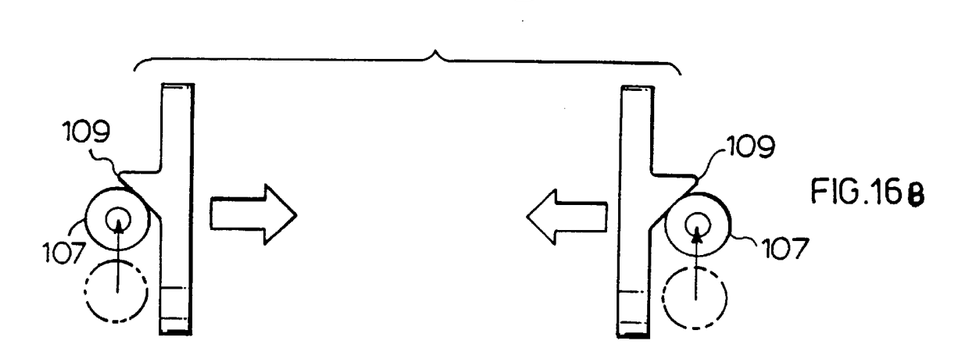
Figure 16C:
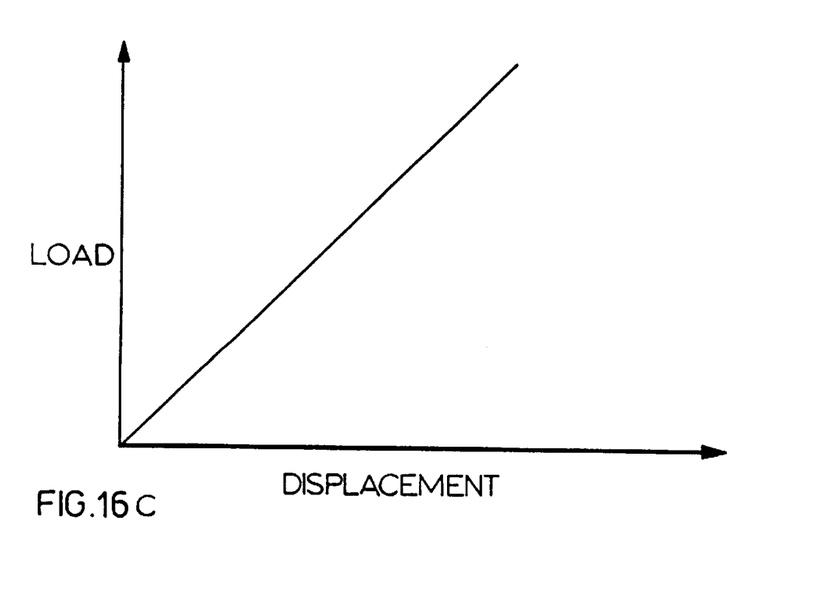

A major aspect of the present invention is to provide a suspension system with an extremely well contained force system that concentrates loads in the suspension geometry control elements (FIG. 7). This eliminates the requirement for large and heavy load bearing structures in remote areas of the vehicle. The compact arrangement is also well suited to front wheel drive systems as there is no encroachment on the half shaft packaging volume. Finally, the system can be designed to include one of the control arms and mounting pivots, thereby combining suspension geometry control and spring/damping in one unit. This modular feature will permit greatly simplified assembly plant installation.

Additional advantages of the system include providing acceptable ride performance using conventional spring/damper technology while actively reacting to handling concerns such as pitch and roll. This is achieved by providing a means to alter the geometric relationship between the wheel and the spring components. This in effect allows an infinitely variable wheel rate. Additionally, the ride height (position of the vehicle above the ground plane) can be varied in a similar manner. This flexibility allows bump inputs to be reacted to by a highly desirable soft springing system while pitch and roll can be dealt with by short periods of stiffening or ride height adjustment. This arrangement eliminates the requirement of complicated anti-dive or anti-squat geometries as well as the need for an anti-roll bar.

Accordingly, the present invention relates to a suspension system for a wheeled vehicle comprising a wheel and hub assembly, a vehicle body relatively much heavier than the wheel and hub assembly, an energy storage medium interposed between the wheel and hub assembly and the vehicle body, and means to releasably store energy in the energy storage medium to any predetermined degree at any relative position between the wheel and hub assembly and the vehicle body upon relative movement between the wheel and hub assembly and the vehicle body; wherein the energy storage medium and the means to releasably store energy in the energy storage medium are constructed as a self-contained module.

In a further aspect of the invention, the energy storage medium generates a force in relation to a displacement.

In a further aspect of the invention, the means to releasably store energy comprises means to convert the vertical motion of the wheel and hub assembly to rotary motion of a connecting arm, and means to convert the rotary motion of the connecting arm to linear motion of the energy storage medium.

In a further aspect of the invention, the means to convert the rotary motion of the connecting arm to linear motion of the energy storage medium includes cam surfaces.

In a further aspect of the invention, the suspension system includes means to independently compress the energy storage medium regardless of the vertical motion of the wheel and hub assembly, to compensate for pitch and roll of the vehicle.

In a further aspect, the invention relates to a suspension system for a wheeled vehicle comprising a wheel and hub assembly, a vehicle body relatively much heavier than the wheel and hub assembly, an energy storage medium mounted on a central axis and interposed between the wheel and hub assembly and the vehicle body, a suspension geometry control member having an inner end and an outer end adapted to pivot about the central axis in response to vertical movement of the wheel and hub assembly, the outer end of the control member being connected to the wheel and hub assembly, and the inner end of the control arm being rotatably connected to at least one cam follower carrier adapted to pivot about the central axis, each cam follower carrier comprising at least one cam follower, each cam follower engaging a cam surface on a ramp ring, each ramp ring being fixed to an energy storage medium platform, each energy storage medium platform being adapted to trap an end of the energy storage medium, the ramp rings and energy storage medium platforms being adapted to travel axially to compress the energy storage medium upon rotation of the cam follower carriers and cam followers over the cam surfaces, and a reaction arm integrated into the energy storage medium platform to prevent rotation of the energy storage medium platform about the central axis.

In a further aspect of the invention, the cam followers are rollers and the cam follower carriers are roller carriers.

In further aspects of the invention, the energy storage medium is a coil spring, thermoset or thermoplastic material, one or more gas accumulators, or disk springs.

In a further aspect of the invention, the relationship between movement of the wheel and hub assembly and compression of the energy storage medium is in addition varied by rotating a ramp ring and energy storage medium platform independently of the cam follower carriers.

In a further aspect of the invention, the ramp ring and energy storage medium platform are in addition rotated independently of the cam follower carriers by means of an actuator acting upon the reaction arm.

In a further aspect of the invention, a damper is interposed between the energy storage medium and the vehicle body to control energy storage medium oscillations.

In a further aspect of the invention, the damper is a rotary damper mounted co-axially with the energy storage medium.

BRIEF DESCRIPTION OF THE DRAWINGS

The invention will be described in greater detail with reference to the accompanying drawings which illustrate a preferred embodiment of the invention, and wherein.

DESCRIPTION OF THE PREFERRED EMBODIMENT

FIG. 1 illustrates a vehicle comprised of five distinct mass systems, the main vehicle body 1 and four independent wheel and hub assemblies 3. The vehicle body 1 is connected to the wheel and hub assemblies 3 by means of interposed coil springs 5. The springs 5 could alternatively be any suitable energy storage medium such as thermoset or thermoplastic materials, gas accumulators, or disk springs.

FIG. 2 illustrates the front of the vehicle negotiating a curve to a driver's right. The vehicle tends to "roll" or rotate outwards on its suspension due to the centrifugal force acting on its centre of gravity.

FIG. 3 illustrates a prior art anti-roll bar 7, interposed between the suspension systems (shown schematically) of two wheel and hub assemblies 3.

Figure 4:
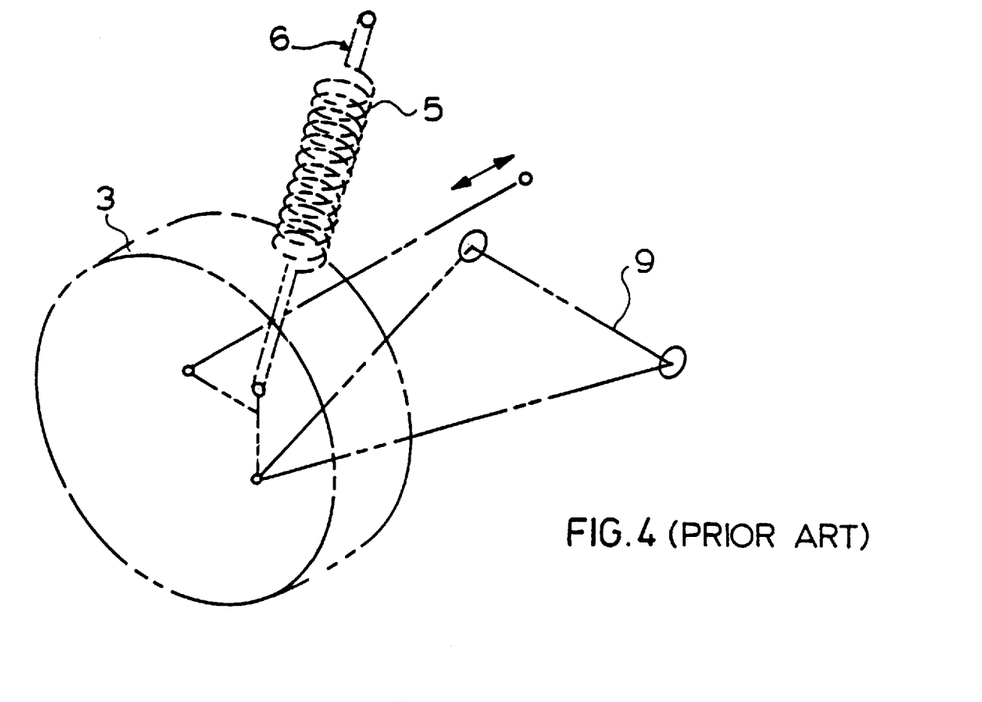
FIG. 4 is a schematic, perspective view illustrating a typical wheel with a prior art MacPherson strut and a single "A" arm.
Figure 5:
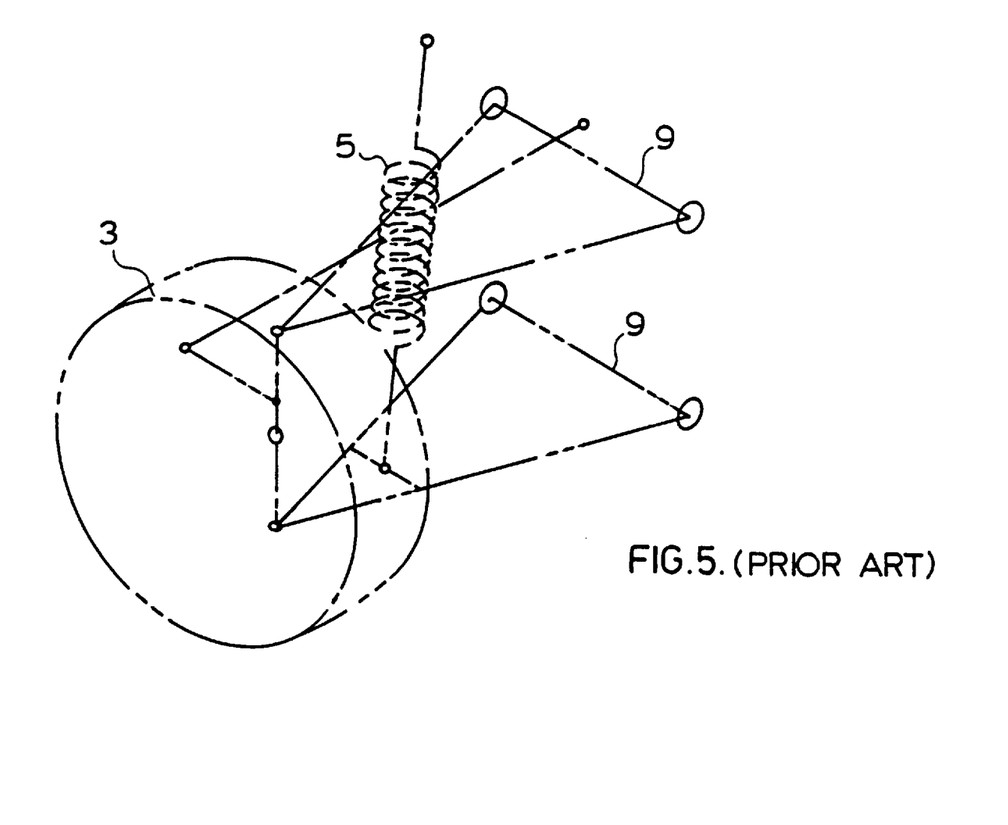
FIG. 5 is a schematic, perspective view illustrating a typical wheel with a prior art double "A" arm.

FIG. 4 illustrates a single "A" arm 9 connected to a wheel and hub assembly 3, controlled by a strut assembly 6 which includes a spring 5.

FIG. 5 illustrates a prior art double "A" arm arrangement.

FIG. 6 illustrates the relationship between force and displacement for typical prior art linear and bi-linear spring rates.

FIG. 7 illustrates schematically the general location of a module 11 embodying the present invention inserted into a double "A" arm suspension arrangement with wheel and hub assemblies 3' and single "A" arm 9'.

In a preferred embodiment, a central feature of the suspension system comprises a pair of cam plates with cam surfaces of a predetermined profile. The cam plates transmit the rotary motion generated at the pivot of the suspension arm, into linear movement parallel to the pivot axis. This allows the spring to be arranged co-axially with the pivot axis to create an extremely compact module.

Referring to FIGS. 8 to 15, the suspension control arm 101, is attached directly to a pair of roller carriers 103 which pivot about a central shaft 105. As the system is subjected to a bump input, the suspension arm 101 rotates the roller carriers 103 around the central shaft 105. Three cam followers, in this case rollers 107, are arranged in each of the roller carriers 103 which engage three cam surfaces 109 on cam plates on each ramp ring 111. The ramp rings 111 are connected to the spring platforms 113 which end trap the coil spring 5'. Although 5' is shown as a coil spring in FIGS. 8, 10, 11, 13, 15, and 19, 5' can be a thermoset or thermoplastic material, one or more gas accumulators, or one or more disc springs. As the roller carriers 103 rotate, the rollers 107 follow the cam surfaces 109 and force the pairs of coacting ramp rings 111 and spring platforms 113 to travel axially, compressing the coil spring 5' and generating the required restoring force. The torque generated by the ramp rings 111 is resolved to ground (the vehicle body) by means of the reaction arms 113a which are integrated into the spring platforms 113. The reaction arms 113a are restricted from rotary motion by torque reaction shaft 117 which is fixed to the vehicle body. Reaction arms 113a are free to move axially on torque reaction shaft 117.

Figure 17A:
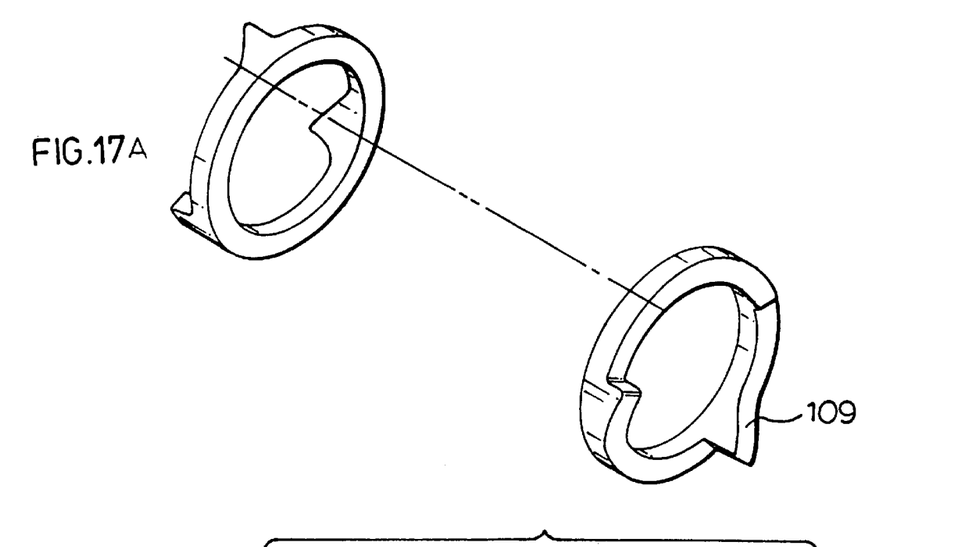
FIGS. 17A, 17B, and 17C illustrate an alternative relationship to that of FIG. 16 with non-simultaneous engagement of cam surfaces.
Figure 17B:
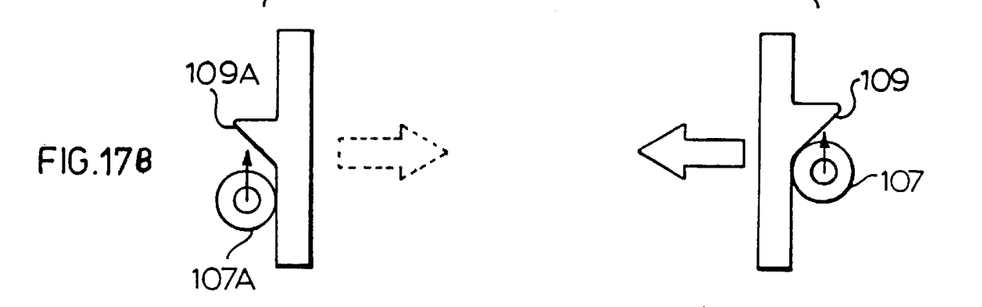
Figure 17C:
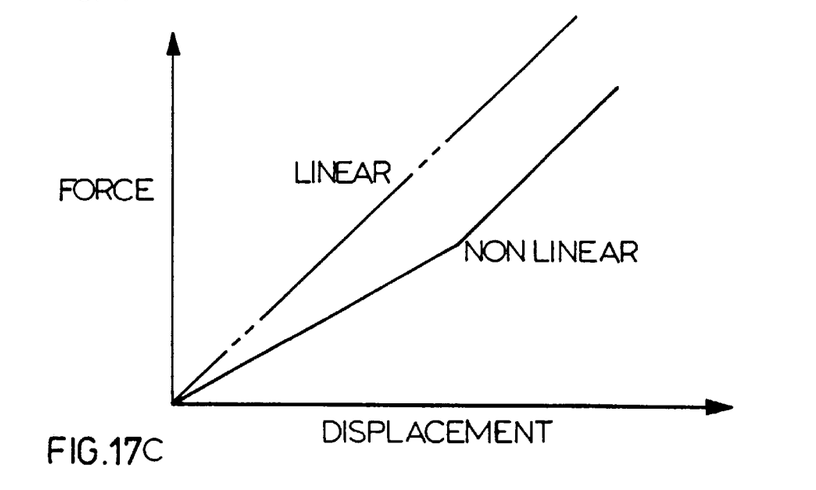
Figure 18:
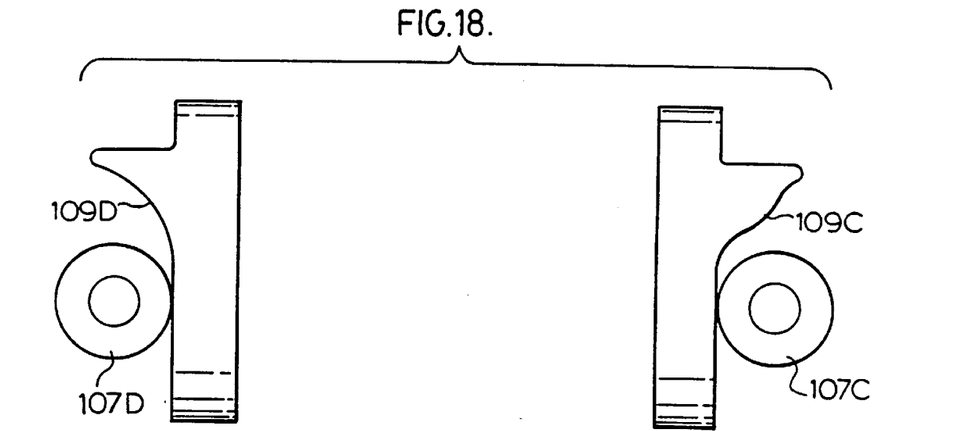
FIG. 18 illustrates a further alternative relationship to that of FIGS. 16 and 17 with multiply sloped cam surfaces.

The relationship between wheel movement and spring compression is dictated by the profile of the cam surfaces 109. By choosing suitable cam surface profiles, a rising wheel rate can be achieved using a linear rate spring, which is both cheaper and easier to manufacture than a rising rate spring. FIG. 17 illustrates one method to achieve a non-linear wheel rate. Roller 107 contacts cam surface 109 to create a first spring rate. Thereafter roller 107A contacts cam surface 109A to create a second, greater spring rate. FIG. 18 illustrates a possible alternative arrangement of rollers 107C and 107D adapted to engage cam surfaces 109C and 109D respectively to achieve a spring rate which varies continuously in a non-linear manner.

Figure 19:
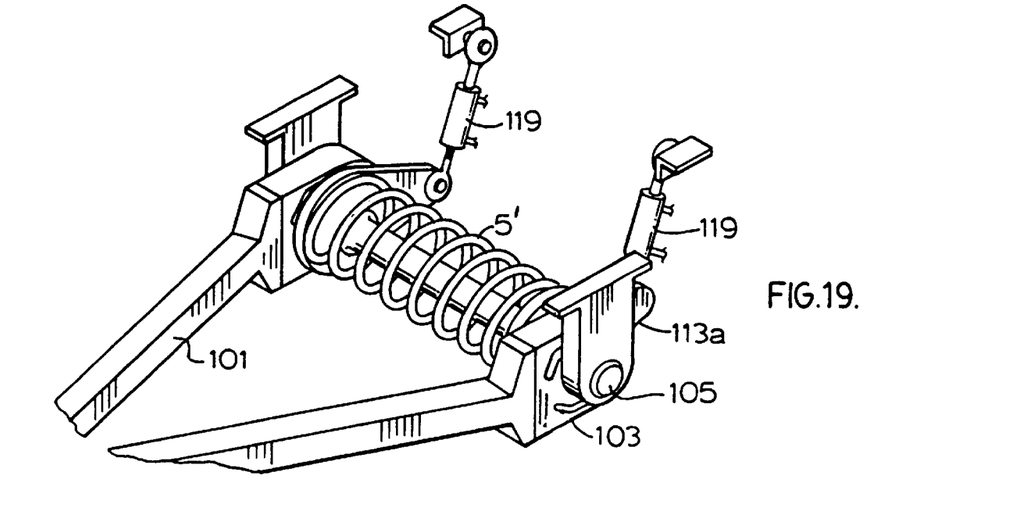
FIG. 19 illustrates a schematic, perspective view of a portion of the suspension system of the invention including actuators to independently rotate the spring platforms.
Figure 20:
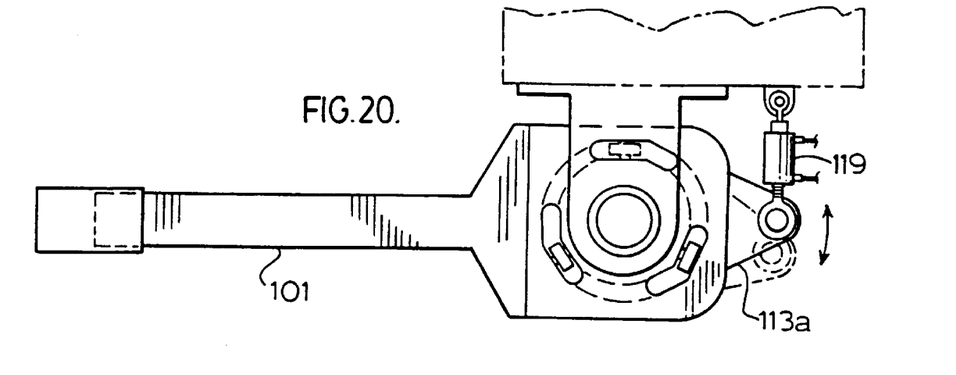
FIG. 20 illustrates a schematic, front view of a portion of the suspension system of the invention including an actuator to independently rotate the spring platforms.

A further aspect of the invention is that the relationship between wheel movement and spring compression can be varied by rotating the ramp ring 111 and spring platform 113 combined units independently of the roller carriers 103. Referring to FIGS. 19 and 20, this can be achieved using an actuator 119 acting upon the reaction arm 113a to adjust ride softness without alteration of the physical components of the suspension system. When this technique is applied to individual wheels, an active suspension system can be created. A computer which senses vehicle body pitch and roll can send appropriate signals to stiffen the suspension of the "loaded" wheel or wheels, thus achieving a flat vehicle attitude. Regular bump inputs continue to be handled by the suspension system without such active control.

Figure 21:
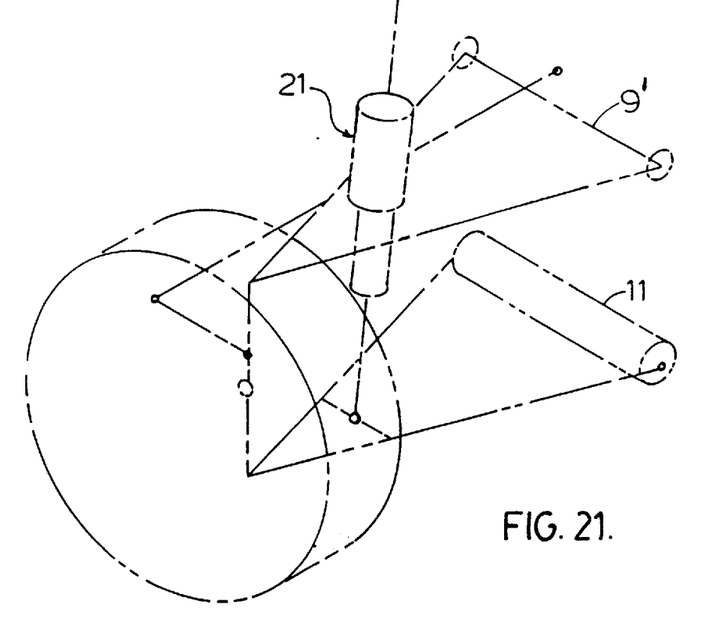
FIG. 21 is a schematic, perspective view of the suspension system of the invention including a linear damper.
Figure 22:
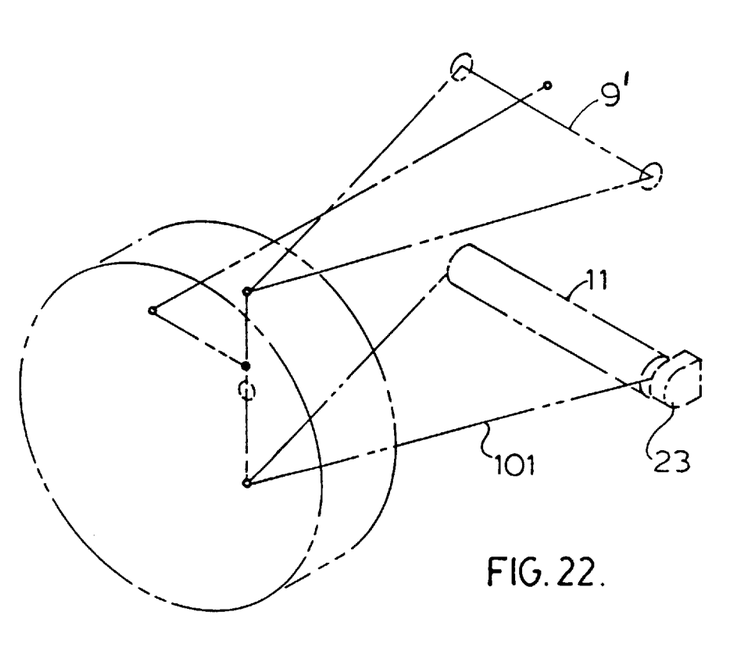
FIG. 22 is a schematic, perspective view of the suspension system of the invention including a rotary damper.

Dampers can be introduced into the suspension system of the invention in order to control spring oscillations. FIGS. 21 and 22 illustrate schematically the invention herein wherein a linear damper 21 or a rotary damper 23 is included in the suspension system.

Modifications of the invention described will be obvious to those skilled in the art and may be employed without diverting from the substance of the invention claimed.

The embodiments of the invention in which an exclusive property or privilege is claimed are defined as follows:

1. A suspension system for a wheeled vehicle comprising:
    (a) a wheel and hub assembly;
    (b) a vehicle body relatively much heavier than the wheel and hub assembly;
    (c) an energy storage medium interposed between the wheel and hub assembly and the vehicle body; and
    (d) means to releasably store energy in the energy storage medium upon relative movement between the wheel and hub assembly and the vehicle body; wherein:
        the energy storage medium and the means to releasably store energy in the energy storage medium are constructed as a self-contained module; and
        the means to releasably store energy comprises:
            (a) means to convert vertical motion of the wheel and hub assembly to motion of a control arm connected to both the wheel and hub assembly and the energy storage medium; and
            (b) means to convert the rotary motion of the control arm to non-linear axial motion of the energy storage medium, said means including cam surfaces profiled to provide a non-linear wheel rate relationship between force and displacement of the wheel.

2. A suspension system as claimed in claim 1, wherein the energy storage medium generates a force in relation to a displacement.

3. A suspension system as claimed in claim 1 comprising means to independently compress the energy storage medium regardless of the vertical motion of the wheel and hub assembly, to compensate for pitch and roll of the vehicle.

4. A suspension system for a wheeled vehicle comprising:
    (a) a wheel and hub assembly;
    (b) a vehicle body relatively much heavier than the wheel and hub assembly;
    (c) an energy storage medium mounted on a central shaft and interposed between the wheel and hub assembly and the vehicle body;
    (d) a suspension geometry control member having an inner end and an outer end adapted to pivot about the central shaft in response to vertical movement of the wheel and hub assembly;
    (e) the outer end of the control member being connected to the wheel and hub assembly, and the inner end of the control member being connected to at least one cam follower carrier adapted to pivot about the central shaft;
    (f) each cam follower carrier comprising at least one cam follower;
    (g) each cam follower engaging a cam surface on a ramp ring, each cam surface profiled to provide a non-linear axial motion to the respective ramp ring;
    (h) each ramp ring being fixed to an energy storage medium platform;
    (i) each energy storage medium platform being adapted to trap an end of the energy storage medium;
    (j) each ramp ring and each energy storage medium platform being adapted to travel axially to compress the energy storage medium upon rotation of the at least one cam follower carrier and the at least one cam follower over the respective cam surface; and
    (k) a reaction arm integrated into each energy storage medium platform to prevent rotation of each energy storage medium platform about the central shaft.

5. A suspension system as claimed in claim 4 wherein the at least one cam follower is a roller.

6. A suspension system as claimed in claims 1 or 4 wherein the energy storage medium is a coil spring.

7. A suspension system as claimed in claim 4, wherein the relationship between movement of the wheel and hub assembly and compression of the energy storage medium is in addition varied by rotating each ramp ring and each energy storage medium platform independently of the at least one cam follower carrier.

8. A suspension system as claimed in claims 1 or 4, wherein a damper is interposed between the wheel and hub assembly and the vehicle body to control energy storage medium oscillations.

9. A suspension system as claimed in claim 8, wherein the damper is a rotary damper mounted co-axially with the energy storage medium.

10. A suspension system for a wheeled vehicle comprising:
   (a) a wheel and hub assembly;
   (b) a vehicle body relatively much heavier than the wheel and hub assembly;
   (c) an energy storage medium mounted on a central shaft and interposed between the wheel and hub assembly and the vehicle body;
   (d) a suspension geometry control member having an inner end and an outer end adapted to pivot about the central shaft in response to vertical movement of the wheel and hub assembly;
   (e) the outer end of the control member being connected to the wheel and hub assembly, and the inner end of the control member being connected to at least one cam follower carrier adapted to pivot about the central shaft;
   (f) each cam follower carrier comprising at least one cam follower;
   (g) each cam follower engaging a cam surface on a ramp ring;
   (h) each ramp ring being fixed to an energy storage medium platform;
   (i) each energy storage medium platform being adapted to trap an end of the energy storage medium;
   (j) each ramp ring and each energy storage medium platform being adapted to travel axially to compress the energy storage medium upon rotation of the at least one cam follower carrier and the at least one cam follower over the respective cam surface;
   (k) a reaction arm integrated into each energy storage medium platform to prevent rotation of each energy storage medium platform about the central shaft, wherein each ramp ring and each energy storage medium platform are in addition rotated independently of the at least one cam follower carrier by means of an actuator acting upon the respective reaction arm.

* * * * *